Patented Aug. 23, 1938

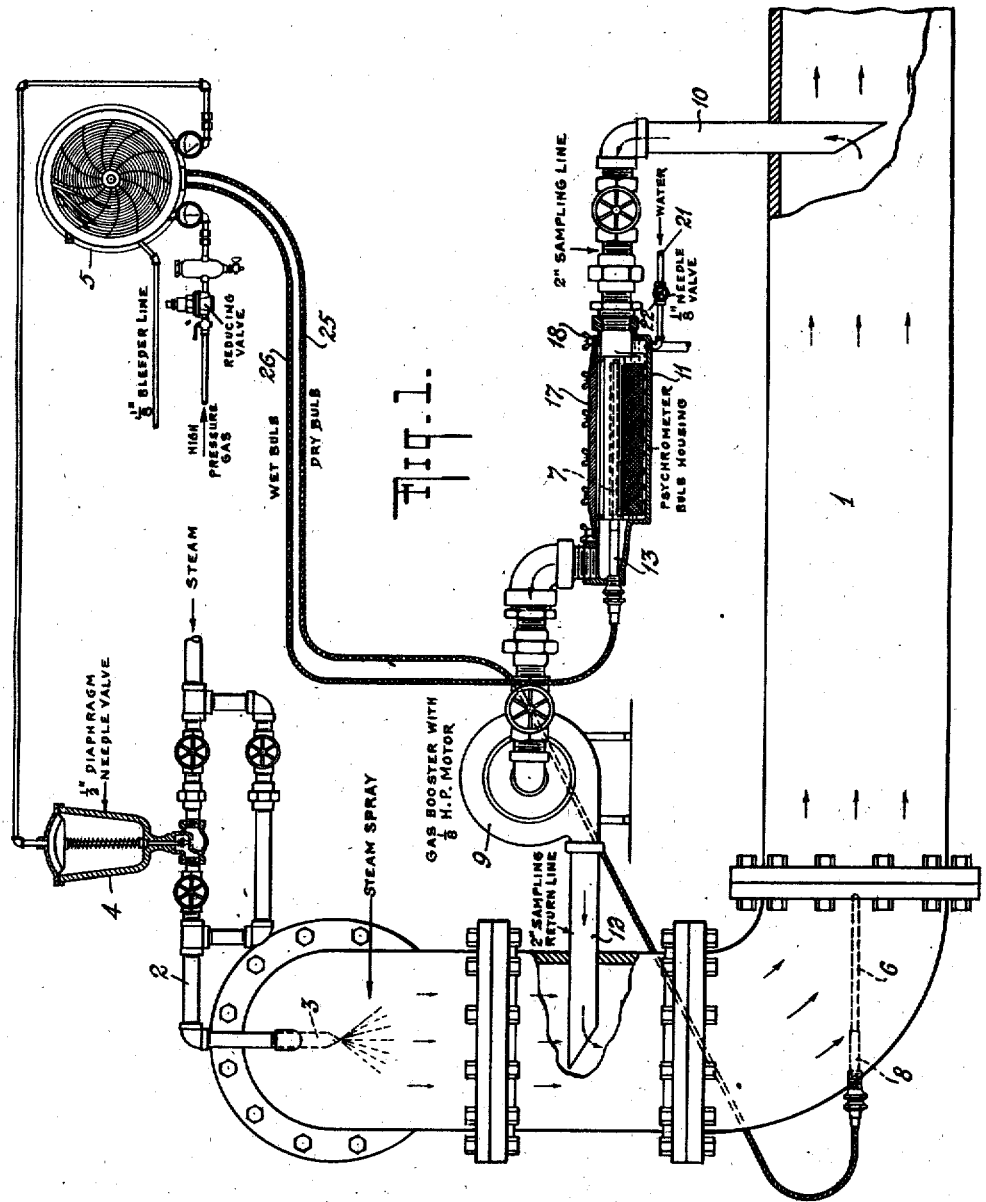

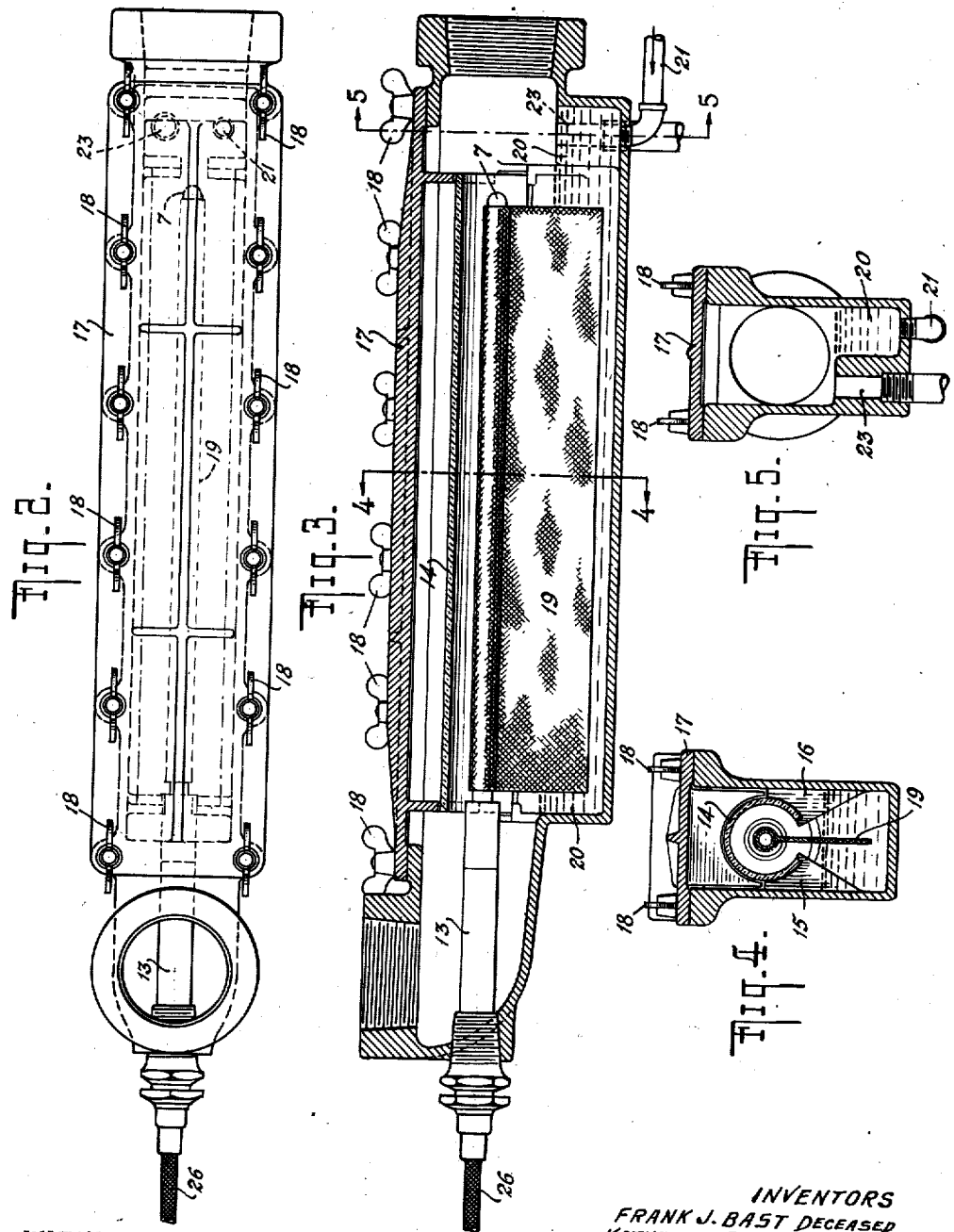

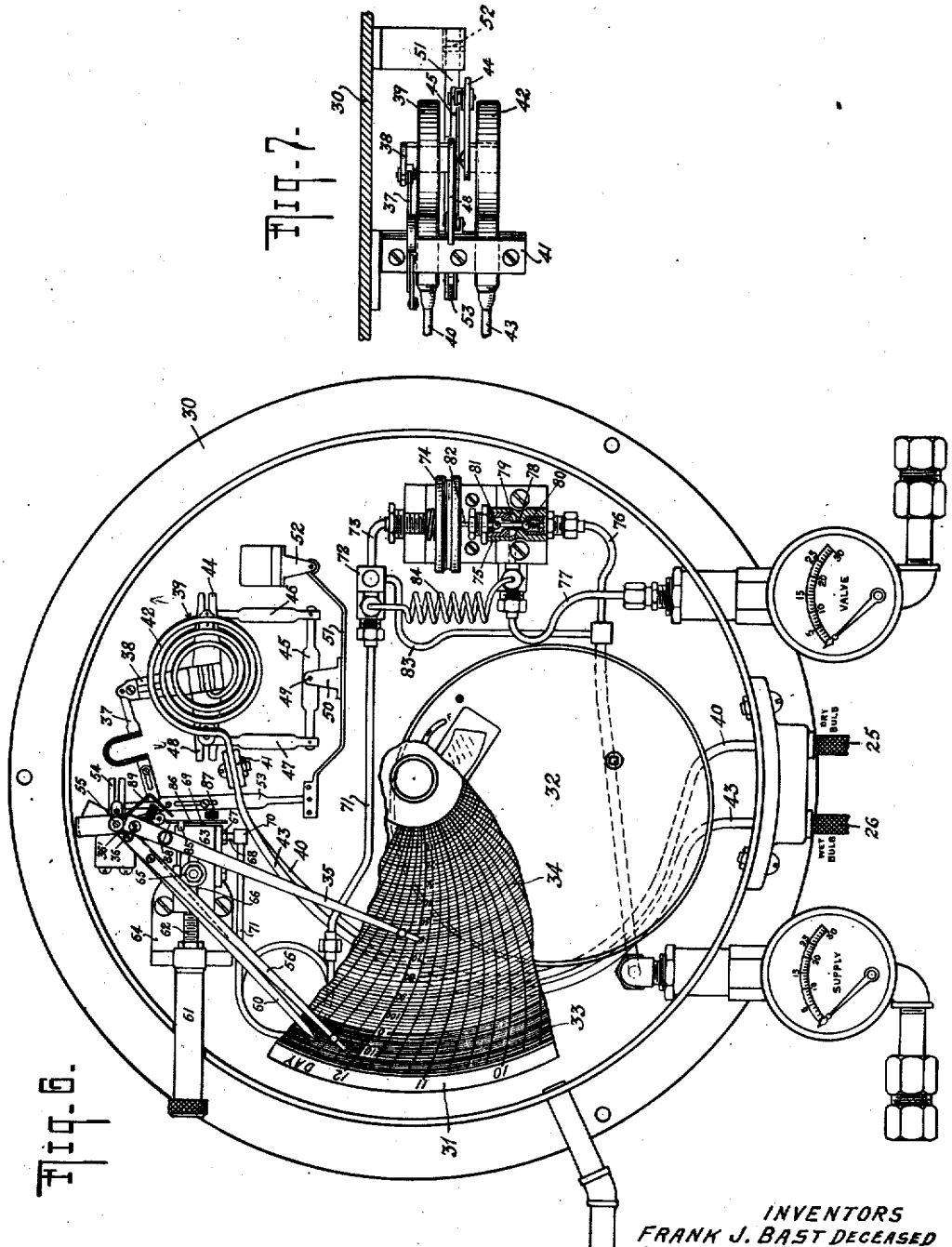

2,128,176

UNITED STATES PATENT OFFICE 2,128,176

APPARATUS FOR MAINTAINING SELECTED DIFFERENTIAL VALUES

Frank J. Bast, deceased, late of Queens Village, New York, N. Y., by Katherine Bast, executrix, Queens Village, New York, N. Y., and Rolf A. F. Sandberg, Brooklyn, N. Y., assignors to Charles J. Tagliabue Mfg. Co., Brooklyn, N. Y., a corporation of New York Application June 23, 1934, Serial No. 732,124

4 Claims. (Cl. 236—44)

This invention relates to apparatus for maintaining predetermined differentials in the conditions at two selected points or places.

It is an object of the invention to provide a durably constructed device of this type which will accurately and reliably maintain a predetermined temperature, pressure or other differential, such as, for example, a substantially constant wet and dry bulb temperature differential in a body of gas.

While the invention is capable of numerous applications, it will be more specifically described as embodied, by way of example, in an apparatus for controlling the degree of humidity of relatively fixed gases by regulating the amount of vapor fed thereinto so as to maintain a substantially constant wet and dry bulb differential.

Another object of this invention is accordingly to provide a device of this type which will automatically maintain a selected psychrometric temperature differential of a body of gas, and which, when the differential setting is adjusted for fluctuations in the dry bulb temperature, can also maintain a predetermined relative humidity in such gas.

It is a further object of the invention to provide adjustable means whereby the content of a vapor in the body of gas may be regulated at will.

According to the present invention, in the embodiment selected for illustration the supply of the vapor whose content in the body of gas is to be maintained at a predetermined value, is controlled by a fluid operated servo-motor, such as a diaphragm needle valve, which in turn is controlled by mechanism responsive to variations in the wet and dry bulb temperature differential of a psychrometer in contact with the gas to correspondingly regulate the feed of the servo-motor as the wet and dry bulb differential varies from the predetermined value.

The present invention is of particular utility in controlling the water vapor content of natural gas by maintaining a vapor content in such gas which is not appreciably below a predetermined minimum. Thus it has been found that distribution pipe systems which previously had been satisfactorily tight for manufactured gas soon began to leak when the same systems were used for natural gas. The reason for this leakage was found to be due to the fact that the natural gas is almost entirely devoid of water vapor, whereas manufactured gas contains from 50% to 100% moisture based on the amount of dry gas. This extreme dryness of natural gas causes the packed joints in the pipe line and the leather diaphragms in the meters to dry out and leak. To avoid replacing of pipes or making joints which are leak-proof for dry gases, it was found that if the natural gas was saturated with water vapor in the form of steam, with an additional oil spray, the old pipe lines soon became tight again.

The invention will be further specifically described in connection with the moistening of natural gas, but it will be understood that the invention is not limited in its application to the humidifying of such gas but is applicable to processes generally in which it is desired to control the vapor content of more or less fixed gases and to processes which depend upon maintaining a selected differential of conditions substantially constant.

The accompanying drawings illustrate by way of example a satisfactory arrangement for humidifying natural gas, Fig. 1 showing a diagrammatic elevation of the entire apparatus, partly in section. Fig. 2 is an enlarged plan view of the wet bulb housing shown in Fig. 1; Fig. 3 is a vertical central section of Fig. 2; Fig. 4 is a transverse section along the line 4—4 of Fig. 3; Fig. 5 is a similar section along the line 5—5 of Fig. 3; Fig. 6 is an enlarged view of the recorder controller shown in Fig. 1 with a part of the chart and its support removed to show the interior structure; Fig. 7 is a plan view of the Bourdon springs, or tubes, shown in Fig. 6.

Referring to Fig. 1 of the drawings which, as stated, illustrates the invention as specifically employed in maintaining the proper amount of moisture in a natural gas line, the reference character 1 designates a portion of a gas distribution system, the pipes of which are usually of large diameter, viz., from 6 to 12", and in which the gas flows in the direction of the arrows. A steam pipe 2 projects through an opening in the pipe 1 and has attached to the discharge end thereof a nozzle 3 which sprays the steam into the stream of gas. A diaphragm needle valve 4 controls the amount of steam intermixing with the gas stream. The opening and closing of the valve 4 are regulated by the controller 5 which includes mechanism responsive to the difference in temperature of the dry bulb 6 and the wet bulb 7. The dry bulb 6, which is filled with a thermometric fluid chosen with due regard to the temperature range and other considerations, is shown mounted in an elbow of the pipe line 1 and is suitably insulated therefrom by a holder 8 of Bakelite or other heat insulating material to minimize the conduction of the ambient temperature of the pipe 1 to such bulb. By placing the dry bulb 6 in the illustrated position direct contact with the flowing gas stream is assured. However, the dry bulb may be mounted at other suitable locations within the pipe 1.

In order to truly measure the psychrometric effect, it is necessary in the present instance that the gas pass over the wet bulb 7 at a velocity of approximately 15 feet per second. As the gas stream of the pipe line 1 generally moves at a slower rate, suitable measures are provided for increasing locally the speed of at least a portion thereof. Thus the psychrometer may be of the aspiration type, the wet bulb 7 being mounted in a sampling line into which gas from the distribution system is drawn at the desired velocity by means of a suction fan 9. The sampling line comprises a pipe 10 of appreciably smaller diameter than the pipe 1 and projects through a suitable opening into the interior of the latter. The intake end of the pipe 10 is positioned approximately in the center of the gas pipe 1, the opening at such intake end being preferably beveled and facing oppositely to the direction of flow of the gas stream so as to divert a portion thereof. The gas drawn up through the pipe 10 passes into the bulb housing 11, over the wick-covered bulb 7, then through the suction fan 9 back into the main gas pipe 1 through the pipe 12. As shown in Figs. 2 and 3, the wet bulb 7 is supported in an opening in one of the end walls of the bulb housing 11 and is insulated therefrom by a covering 13 of Bakelite or other heat insulating material to minimize the influence of the temperature of the housing on the bulb. As it is desirable to keep the air space around the web bulb as small as the area of the pipe 10 in order to increase the velocity of the gas passing the bulb 7, the housing is so constructed that its walls are quite near to such bulb. A Bakelite shield 14, see Figs. 3 and 4, which almost entirely surrounds the wet bulb 7, is provided in order to minimize the influence of the temperature of the air surrounding the housing casting, such shield also reducing the cross-sectional area of flow. The shield 14 is supported in the housing by lugs 15 and 16 provided on the inner wall of the housing casting. The cover 17 of the housing is held in gas-tight manner by wing nuts 18 and may be removed to clean or replace the wick 19 on the wet bulb 7. The wick passes over the wet bulb 7 and has a depending portion which extends into a well 20 formed in the lower portion of the housing 11. The water contained in the well 20 is supplied through a pipe 21, see Figs. 1 and 3, the flow of water being controlled by a needle valve 22. An overflow pipe 23 of suitable height is provided in the wet bulb housing to maintain the water level in the well at a predetermined height, as shown in Fig. 5, the pipe being provided with a suitable trap (not shown), as is well understood in the art, to prevent escape of gas through such pipe. The dry bulb 6 and the wet bulb 7 are connected by suitable connecting tubes 25 and 26, respectively, to the controlling device 5, as shown in Figs. 1 and 6.

The controlling device 5 comprises a casing 30 of any suitable type within which is rotatably supported a recording sheet or chart 31 operated by the clockwork mechanism 32 in a manner well known in the art. The chart 31, as shown in Fig. 6, is divided off into two sections 33 and 34, the section 33 receiving the record of the wet and dry bulb temperature differential and the section 34 the record of the variations in temperature at the dry bulb 6. A pen arm or stylus 35 fixed, as by fastening means 36, to an angular bracket 36' pivoted upon a pin 55 mounted within the casing 30 registers the temperature of the dry bulb on the chart section 34. The stylus 35 is actuated by any suitable responsive mechanism and in the embodiment illustrated is connected by an adjustable link 37 to an arm 38 fixed to the inner end of a Bourdon spring 39. The latter is connected by a capillary tube 40 to a source of pressure such as the dry bulb 6 by means of the connection 25. It will be understood that the outer end of the spring 39 is fixed to the casing 30 as by a clamp 41 while the inner end is free to move in response to changes in the pressure of the fluid in such spring. Thus any changes in the pressure of the fluid in the spring 39 will cause the stylus 35 to pivot loosely about the pin 55 in a direction depending upon whether the temperature of the gas stream in the pipe 1 is increasing or decreasing and will register on the chart 34 the temperature existing in the gas main 1.

A second Bourdon spring 42 is also supported by the clamp 41 in parallel relation with respect to the Bourdon spring 39 and coiled in the same direction as the latter and is connected by a capillary tube 43 to a second source of pressure such as the wet bulb 7 by means of the connection 26. Attached to the inner end of the Bourdon spring 42 is an arm 44 which is connected to one end of a walking beam or lever 45 by means of a link 46. A link 47 connects the opposite end of the walking beam 45 to an arm 48 attached to the inner end of the Bourdon spring 39. The walking beam 45 is fulcrumed at 49 on a bracket 50 supported by a lever 51. The latter is pivotally supported at one end by a bracket 52 fixed within the casing, the other end of the lever being connected to a link 53 whose upper end is connected to an arm 54 secured at one end to the pin or spindle 55 supported in the casing. Also secured to the spindle 55 is the differential pen arm 56 which moves over the chart 31. By this arrangement, the differential of the temperatures of the wet and dry bulbs will be registered on the scale 33 and any changes in the difference of pressure of the fluids in the Bourdon springs 39, 42 due to a change of conditions in the pipe 1, will cause the pen arm 56 to pivot about the spindle 55 in a direction depending upon whether the temperature differential of the gas in the pipe 1 is increasing or decreasing. For example, when both Bourdon springs 39 and 42 are caused to expand the same amount due to an increase in temperature of the gas stream, the wet and dry bulb temperature differential of the gas remaining the same, dry bulb arm 48 will move downwardly and wet bulb arm 44 will move upwardly an equal amount, giving a purely circular motion to the walking beam or lever 45 about its fulcrum 49, thereby leaving such fulcrum in unchanged position. This is due to the fact that, as can be seen from the drawings, the arms 44 and 48 are of equal effective length, and likewise the links 46 and 47, the latter being connected to the lever 45 equidistantly from the fulcrum 49. However, should only one of the Bourdon springs 39, 42 expand or contract, or should one expand or contract a greater amount than the other due to a change in the temperature and/or vapor content of the gas in the pipe 1, the fulcrum point 49 of the walking beam will be lowered or raised as the case may be, thus causing the lever 51 to move about its fulcrum to correspondingly lower or raise the link 53, and through the arm 54 and spindle 55 swing the pen arm 56 a corresponding amount outwardly or inwardly. For instance, should only one of the Bourdon springs, such as the wet bulb spring 42, contract due to a lower temperature at wet bulb 7, indicating a drop in the temperature differential of the gas and hence a lower humidity, the dry bulb temperature of the gas remaining the same, the arm 44 will move downwardly and carry with it the fulcrum 49, bracket 50, lever 51, link 53, and arm 54. The pen arm 56 will them tend to rotate outwardly with the spindle 55 and register an increase in the difference between the temperatures of the wet and dry bulbs. Thus by this arrangement any variation in the differential of the movements of the Bourdon springs 39 and 42 is transmitted to the pen arm 56. The control mechanism whereby correction is made for the change in the pressure differential so as to keep it constant, and keep the relative humidity constant for a given dry bulb temperature, will now be described.

Pivoted concentrically with the stylus or pen arm 56 is a setting pointer or arm 60 which is adapted to overlie the field 33 on the chart 31 as shown in Fig. 6. The setting of the pointer 60 predetermines by means of the mechanism hereinafter described, the vapor content of the gas stream in that section of the distribution system where the dry and wet bulbs 6, 7 are located. The setting of the pointer 60 is adjusted without opening the casing 30 by mechanism similar to that specifically described in United States Patent No. 1,837,397 to Frank J. Bast, dated December 22, 1931. Thus by turning the knurled end of the rotatable rod 61 which extends into the casing 30, a screw 62 which passes through a correspondingly threaded sleeve fixedly mounted interiorly of the rod 61, is caused to shift a block 63, attached to one end thereof, longitudinally in a direction depending upon which way the rod 61 is turned. The block 63 which is slidably mounted on a base 64 fixed within the casing and is guided in its sliding movement by a bolt 65 passing through an elongated slot 66 in such block, is operatively connected to the pointer 60 so that any movement of the block 63 will cause the pointer 60 to rotate about its pivot in the direction that the block 63 is moved by the rod 61.

In a manner similar to that described and shown in the aforementioned patent, the inner end of the block 63 is provided with a tapped hole (not shown) which receives an internally and externally threaded member 67. An externally threaded screw 68 is received within the member 67. The screw 68 is provided with an axial channel communicating at its upper end with a nozzle 69 which projects through a vertical slot cut through the right-hand section of the block 63 as shown and described in the above mentioned patent. The outlet end of the nozzle is planar for the purpose to be described hereinbelow. The member 67 is externally threaded right-hand and internally threaded left-hand so that upon revolution thereof, the screw 68, which is threaded left-handed, is given an axial or longitudinal movement free of rotation. Thus upon rotation of the member 67 the nozzle 69 will be moved upward or downward. The lower end of the screw 68 is fitted with a head or cap 70 which is tapped to receive the threaded end of an air conduit 71 which is soldered to the head and communicates with the axial channel in screw 68.

The conduit 71 is suitably connected to a block 72 which is connected by means of a pipe 73 with the interior of an expansible or capsular spring 74. The capsule 74 is operatively associated with an air relay or pilot valve shown in the form of a ball valve 75 which controls the communication between an air supply conduit 76 and a conduit 77, the latter connecting the diaphragm needle valve 4 with the air passage 78 in the valve 75 through a channel 79 formed in the valve casing. The valve 75 may be composed of two balls 80 and 81 mounted on a stem 82 which is actuated by the capsule 74. The lower ball valve 80 seats on the lower end of the passage 78 when the valves are in raised position, as shown in Fig. 6, thus cutting off the source of air supply to the conduit 77. In this position of the valves, the air or other pressure fluid in the diaphragm valve 4 and conduit 77 is exhausted into the atmosphere through an enlarged bore in the valve body which loosely receives the stem 82. When the valves are in lowered position the upper valve 81 seats on the upper end of the passage 78, thus closing the opening to the atmosphere, the valve 80 being in open position allowing air from the supply conduit 76 to flow into the conduit 77 and valve 4 through the air passage 78 and channel 79. A conduit 83 connects the air supply pipe 76 with the block 72. The block has a small hole through which air is supplied to the capsule 74 and to the nozzle 69, the orifice of the latter being slightly larger than such hole, and when completely open permits all the air going through block 72 to escape therethrough, so that there is substantially no pressure in the capsule 74. A shunt or pressure balancing coil or line 84 is provided between the feed line 77 to the diaphragm valve 4 and the feed back 73 from the capsule 74 to the nozzle 69, such coil operating to dampen the initial flow of air to and from the diaphragm valve 4 and preventing sudden and rapidly fluctuating changes in the feed of the steam to the pipe 1, as described in detail in the patent to Frank J. Bast, 1,988,775, dated January 22, 1935.

Pivoted at 85 upon the block 63 above the nozzle 69 is a plate or flap valve 86 counter-weighted at 87 and adapted to cover the orifice or outlet end of the nozzle 69 so as to prevent or limit the escape of air therefrom. Due to the fact that the nozzle outlet is cut along a plane, an air-tight engagement between the valve 86 and nozzle 69 is assured when required. The flap valve 86 has a portion 88 thereof extending above its pivot and located in the path of movement of an arm 89 pivoted about the pivot of the stylus or pen arm 56 and fixed to the latter so as to move therewith.

The operation of the mechanism is as follows: Assuming that the flap valve 87 is resting against the outlet end of the nozzle 69, as shown in the drawings, i. e. the nozzle 69 is closed, air from the supply conduit 76 is charged into the capsule 74 through the conduit 83, block 72 and conduit 73. The diaphragm 74 expands and forces the stem 82 downwardly, causing the ball valve 81 to seat on the upper end of the passage 78, thus cutting off communication between the conduit 77 and the external atmosphere. Simultaneously the ball valve 80 moves from its seating position on the lower end of the passage 78, opening the communication between the conduit 77 and the supply conduit 76, so that air from the latter is charged through the passage 78, channel 79 and conduit 77 into the diaphragm valve 4, depressing the diaphragm thereof and causing the feed valve controlled thereby to stop the feed of steam into the pipe system 1. Should the wet and dry bulb temperature differential of the gas flowing through the pipe 1 rise above a predetermined value as indicated by the setting of the arm 60 and the corresponding position of the nozzle 69, that is, if the relative humidity falls, the arm 89 will engage the extension 88 of the flap valve 86 and oscillate the same to open the nozzle 69 partially. A portion of the air in the capsule 74 is thus permitted to discharge through the nozzle 69 and the ball valves are permitted to rise to close partially the communication between the supply conduit 76 and conduit 77 and to open partially the communication between pipe 77 and the atmosphere. Sufficient air is thereupon discharged by the pipe 77 and the diaphragm valve 4 into the atmosphere to cause the feed valve controlled thereby to open to an extent sufficient to feed just enough fluid, such as steam, into the pipe system 1 to maintain the temperature differential of the gas stream at a predetermined value.

It will be obvious that the present invention may be applied to arrangements other than the specific one illustrated, and that variations may be resorted to within the scope of the appended claims without departing from the spirit of the invention. Thus, it is not essential that the vapor be introduced into the gas in the form of vapor; it may be injected in the form of liquid, preferably finely atomized, and where in the claims we speak of introducing vapor, it is to be understood that other states of aggregation ultimately reducible to the vapor state are included as equivalents. It will also be evident that our improved mechanism may be employed to maintain substantially constant a pressure differential between two selected places and may in fact be used to respond to fluctuations of various kinds of magnitudes so as to maintain a predetermined differential.

It will be understood that the mechanism above described essentially controls automatically only the wet and dry bulb temperature differential, and controls the relative humidity only for a fixed dry bulb temperature; where the dry bulb temperature varies, the temperature differential setting must be varied accordingly if a selected humidity is to be maintained. Thus the attendant may be supplied with a chart or table indicating the differential setting required for various dry bulb temperatures to maintain a selected relative humidity. Also, while Bourdon springs are shown for purposes of illustration, any other suitable temperature-responsive means may readily be substituted as an equivalent thereto under our invention.

We claim:

1. Apparatus for maintaining a substantially constant wet and dry bulb temperature differential in a body of gas, comprising a conduit for conducting a gas to a place of storage or use, means for introducing into the conduit a controlled quantity of vapor, wet and dry bulb mechanism for determining the degree of saturation of the gas with said vapor, said mechanism comprising a thermostatic bulb disposed in said conduit, a by-pass for diverting a portion of said gas stream, said by-pass including a housing having an inlet and an outlet opening, a well in said housing, means for feeding water to said well, an overflow in said housing to maintain the water level in said well at a predetermined height, a thermostatic bulb mounted in said housing, a wick surrounding said bulb and depending therefrom into the water in said well, means for causing the diverted gas to flow through said housing and over said wet bulb at a velocity greater than that of the gases in the conduit to obtain an increased psychromatic effect, and mechanism controlled by the differential movements of said wet and dry bulb mechanism for controlling said vapor introducing means to cause the latter to feed so much vapor into the conduit as will maintain the depression of the wet bulb temperature at substantially the predetermined value.

2. In an apparatus for maintaining a substantially constant wet and dry bulb temperature differential in a body of gas, the combination with a vapor feeding valve adapted to introduce into the body of gas a controlled quantity of vapor, of mechanism for translating variations of the wet bulb depression of such gas from a desired value into adjustments of said valve, comprising Bourdon tubes operatively connected with wet and dry bulbs acted on by said gas, an arm attached to the inner end of each of said Bourdon tubes, a pivotally supported lever, a second lever pivoted intermediate its ends on said lever, links connecting said arms to the opposite ends of said second lever, the angular movements of the first-mentioned lever corresponding to departures of the wet bulb depression from the predetermined value, and mechanism actuated by said first-mentioned lever for adjusting the position of said valve.

3. Apparatus for maintaining a substantially constant wet and dry bulb temperature differential in a body of gas, comprising a conduit for conducting a gas to a place of storage or use, an air operated valve for introducing into the conduit a controlled quantity of vapor, wet and dry bulb mechanism responsive to the degree of saturation of the gas with said vapor, said mechanism comprising a dry bulb arranged in the path of the gas, a by-pass for diverting a portion of the gas stream, means for causing the diverted gas to flow through said by-pass at a velocity greater than that of the gases in the conduit, a wet bulb arrangement disposed in said by-pass, a pair of Bourdon tubes connected at one end to the dry and wet bulbs respectively, a lever connected at its ends to the other ends of the Bourdon tubes and in such manner that expansion and contraction of the Bourdon tubes to equal degrees causes only rotation of the lever about its pivot, whereas unequal degrees of expansion or contraction produce bodily movement of said lever, mechanism partaking of the bodily movement of said lever and an air relay controlled by said mechanism for governing the pneumatic pressure on said valve.

4. Apparatus for maintaining a substantially constant wet and dry bulb temperature differential in a body of gas, comprising a conduit for conducting a gas to a place of storage or use, a valve for introducing into the conduit a controlled quantity of vapor, wet and dry bulb mechanism responsive to the degree of saturation of the gas with said vapor, said mechanism comprising a dry bulb arranged in the path of the gas, a by-pass for diverting a portion of the gas stream, means for causing the diverted gas to flow through said by-pass at a velocity greater than that of the gases in the conduit, a wet bulb arrangement disposed in said by-pass, a pair of Bourdon tubes each connected at one end to the dry and wet bulbs respectively, a lever connected at its ends to the other ends of the Bourdon tubes and in such manner that expansion and contraction of the Bourdon tubes to equal degrees causes only rotation of the lever about its pivot, whereas unequal degrees of expansion or contraction produce bodily movement of said lever, and means partaking of the bodily movement of said lever and operatively connecting said lever with said valve to open the latter upon an increase of said temperature differential beyond a predetermined value thereof.

KATHERINE BAST,
*Executrix of the Estate of Frank J. Bast, Deceased.*
ROLF A. FREDR. SANDBERG.

CERTIFICATE OF CORRECTION.

Patent No. 2,128,176. August 23, 1938.

KATHERINE BAST, EXECUTRIX OF
FRANK J. BAST, DECEASED; ET AL.

It is hereby certified that error appears in the printed specification of the above numbered patent requiring correction as follows: Page 4, first column, line 71, claim 1, for the words "for determining" read responsive to; same page, second column, line 7, same claim 1, after "well," insert the words and comma and a device for translating wet and dry bulb temperature differentials into differential movements of a mechanical member,; and lines 12 and 13, strike out the words "wet and dry bulb mechanism" and insert instead the word member; and that the said Letters Patent should be read with this correction therein that the same may conform to the record of the case in the Patent Office.

Signed and sealed this 11th day of October, A. D. 1938.

Henry Van Arsdale (Seal) Acting Commissioner of Patents.

that of the gases in the conduit, a wet bulb arrangement disposed in said by-pass, a pair of Bourdon tubes each connected at one end to the dry and wet bulbs respectively, a lever connected at its ends to the other ends of the Bourdon tubes and in such manner that expansion and contraction of the Bourdon tubes to equal degrees causes only rotation of the lever about its pivot, whereas unequal degrees of expansion or contraction produce bodily movement of said lever, and means partaking of the bodily movement of said lever and operatively connecting said lever with said valve to open the latter upon an increase of said temperature differential beyond a predetermined value thereof.

KATHERINE BAST,
*Executrix of the Estate of Frank J. Bast, Deceased.*
ROLF A. FREDR. SANDBERG.

CERTIFICATE OF CORRECTION.

Patent No. 2,128,176. August 23, 1938.

KATHERINE BAST, EXECUTRIX OF

FRANK J. BAST, DECEASED; ET AL.

It is hereby certified that error appears in the printed specification of the above numbered patent requiring correction as follows: Page 4, first column, line 71, claim 1, for the words "for determining" read responsive to; same page, second column, line 7, same claim 1, after "well," insert the words and comma and a device for translating wet and dry bulb temperature differentials into differential movements of a mechanical member,; and lines 12 and 13, strike out the words "wet and dry bulb mechanism" and insert instead the word member; and that the said Letters Patent should be read with this correction therein that the same may conform to the record of the case in the Patent Office.

Signed and sealed this 11th day of October, A. D. 1938.

Henry Van Arsdale (Seal) Acting Commissioner of Patents.